Nov. 3, 1936.  F. C. BEST  2,059,305
MOTOR VEHICLE
Filed Oct. 23, 1933  2 Sheets-Sheet 1
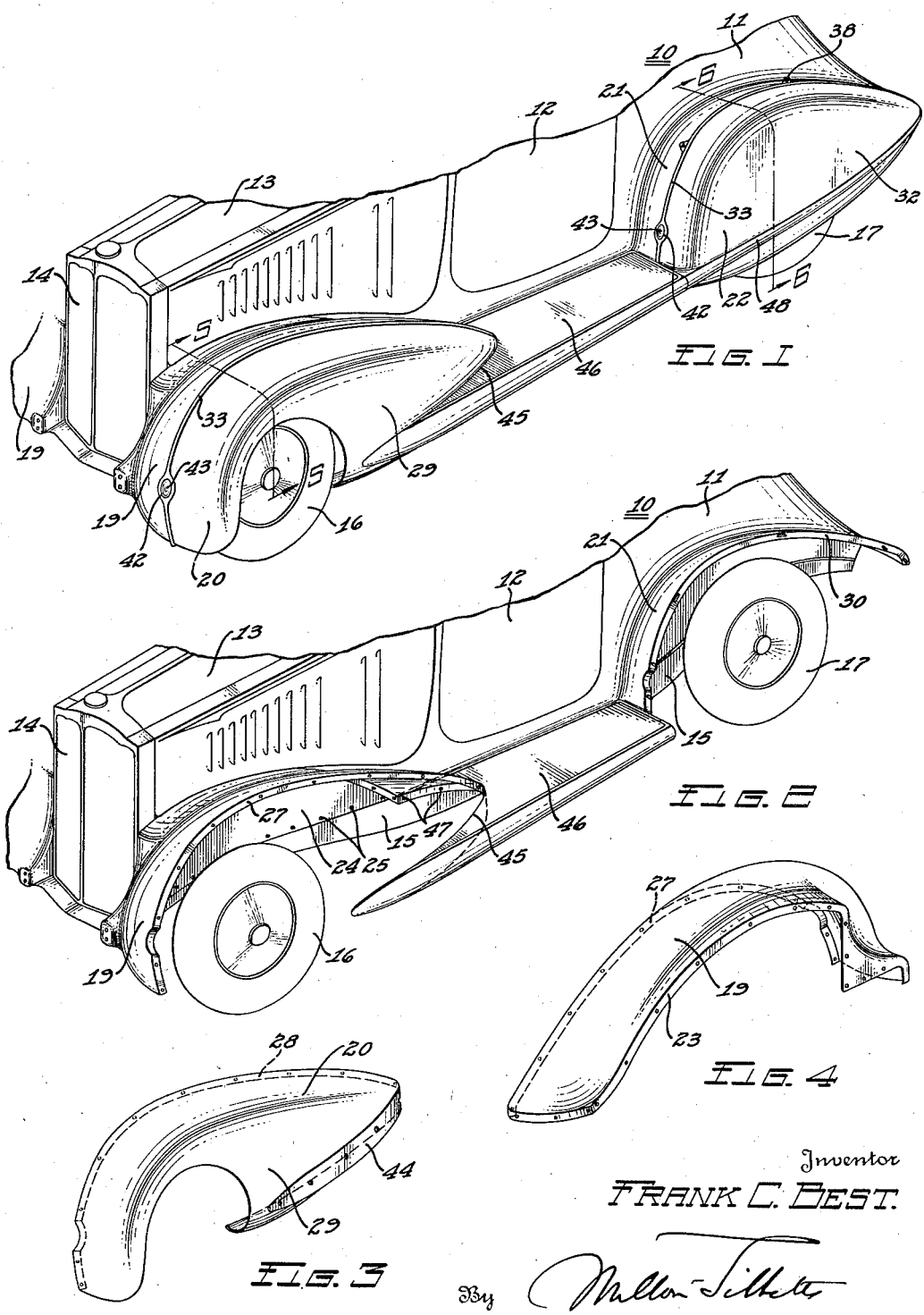

Nov. 3, 1936.    F. C. BEST    2,059,305
MOTOR VEHICLE
Filed Oct. 23, 1933    2 Sheets-Sheet 2

Inventor
FRANK C. BEST.
By Milton Tibbets
Attorney

Patented Nov. 3, 1936

2,059,305

UNITED STATES PATENT OFFICE 2,059,305

MOTOR VEHICLE

Frank C. Best, Detroit, Mich., assignor to Packard Motor Car Company, Detroit, Mich., a corporation of Michigan Application October 23, 1933, Serial No. 694,702

3 Claims. (Cl. 280—152)

This invention relates to vehicles and more particularly to fender and running board structure for vehicles.

It is customary in the manufacture of motor vehicles to form each of the wheel fenders from a single sheet of metal. The tendency of the fender design is toward greater stream lining and more extended outer walls. The draw required, both longitudinally and laterally, in forming fenders of this type from a single sheet of metal is becoming so great that considerable reworking and scrappage results and hence initial and replacement cost, and the cost of reworking after collision is excessive.

An object of the invention is to provide a new and novel sheet metal wheel fender structure of an extremely stream lined design which can be manufactured and serviced for a relatively low cost.

Another object of the invention is to provide a wheel fender structure having an outer removable section formed of material more readily deformable than the material of an inner section so that, in case of collision, there will be less likelihood of damaging the inner section.

Another object of the invention resides in providing a new and novel form of fender which is composed of two detachable sections having their joint extending longitudinally of the crown and covered by a suitable molding.

A still further object of the invention is to provide a sectional fender structure with means for protecting the junction of the sections from moisture.

Still another object of the invention is to provide vehicle fenders which are divided longitudinally and detachably secured together so that the outer sections can be readily removed for repair or replacement.

Other objects of the invention will appear from the following description taken in connection with the drawings, which form a part of this specification, and in which:

Fig. 1 is a perspective view of a portion of a motor vehicle having fenders and a running board structure incorporating my invention;

Fig. 2 is a similar view with the outer sections of the fenders removed;

Fig. 3 is a perspective view of the outer section of a front fender;

Fig. 4 is a perspective view of the inner section of a front fender looking toward the edge which is attached to the vehicle;

Figure 5:
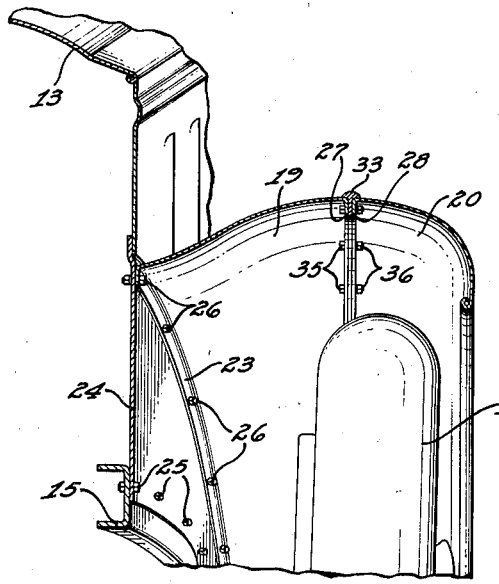
Fig. 5 is a sectional view of the front fender and mounting structure taken on line 5—5 of Fig. 1.

Referring now to the drawings by characters of reference, 10 designates generally a motor vehicle body having a sheet metal covering wall 11 and doors as indicated at 12. The hinged hood 13 encloses an engine (not shown) and forwardly of the hood is arranged the radiator 14. Frame sills, as indicated at 15, extend longitudinally of the body and supporting the frame are front and rear wheels as indicated at 16 and 17 respectively. The wheels are mounted on axle structures, the rear one being indicated at 18 and suitable spring suspension (not shown) is arranged between the axles and the frame in a conventional manner.

It is the usual practice to provide fenders, for the front and rear wheels, which are each formed from a single piece of sheet metal and attached to the side of the body or the frame. Between the front and rear fenders, at each side of the vehicle, there is usually arranged a running board. The present tendency of fender design has, for sometime, been toward further stream lining and more complete enclosure of the wheels and the bending and drawing operations required to form such fenders from single sheets of metal have necessarily become more difficult and expensive. Because of the initial cost, the replacement of fenders is relatively expensive and the design is such that the reworking of damaged fenders is more expensive than it was with fenders which were not so stream lined and which did not so completely enclose the sides of the wheels.

In order to reduce the cost of the formation of stream lined fenders having extended side walls and the cost of replacement and reworking of any type of fenders, I propose to form them in sections which are detachably associated and preferably with their joint extending longitudinally of the crown. In the illustrated embodiment of the invention, each front fender is composed of two sections 19 and 20 and each rear fender is composed of two sections 21 and 22. The inner section 19 of the front fender is formed with an inturned flange 23 along the inner edge for the purpose of engaging a mounting plate 24 which is secured to the side sill by bolts, as indicated at 25. The flange 23 is secured to the plate by bolts, as indicated at 26, and the arrangement is such that the hood side can overlie the upper edge of the plate just above the fender section. The outer edge of the inner fender section is formed with an inturned flange 27 and the outer fender section is formed along its inner edge with an inturned flange 28 which is preferably similar to the flange 27 and formed to extend in parallel relation therewith. The outer portion of the fender section 20 is turned down to provide a side apron 29 which extends longitudinally of the fender structure, such apron being provided with an open portion to permit removal of the front wheel 16.

As previously set forth, the rear fender is likewise composed of sections. The inner section 21 is preferably formed from the sheet metal cover 11 of the body and the outer edge thereof is bent down to form a longitudinally extending flange 30. This inner section does not necessarily have to be formed as a part of the body covering but can be a separate piece which is secured to the body if desired. The outer section of the rear fender has a flange 31 formed along the inner edge thereof which is adapted to extend parallel with the flange 30 when the rear fender sections are assembled together. This outer fender section is formed with a full apron or outer wall 32 which encloses the major portion of the side of the rear wheel 17. The rear fender, like the front fender, is preferably formed so that the crown is divided longitudinally of the vehicle. A cover plate 50 extends between the body wall 11 and the frame 15 adjacent the rear wheel which with the fender structure substantially encloses the rear wheel.

Figure 7:
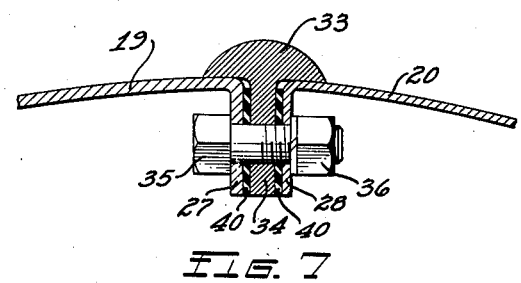
Fig. 7 is a sectional view of the front fender showing a modified form of joint sealed from moisture.
Figure 8:
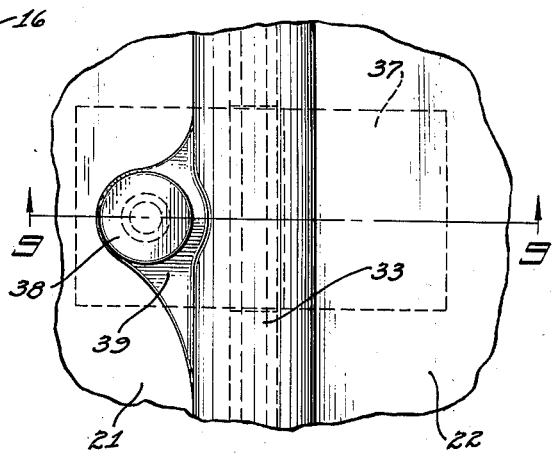
Fig. 8 is a plan view of a fragment of the rear fender illustrating one of the securing means for detachably holding the fender sections together.

The front and rear fender sections respectively are secured together by means which is preferably detachable so that the outer sections can be removed and replaced or repaired and, in the case of the rear fender, to also permit removal of the wheel. Between the sections of the fenders I propose to provide a molding having a head portion 33 overlying the joint between the adjacent flanges of the fender sections and a shank portion 34 arranged to extend between such flanges. As best shown in Figs. 5 and 7, the front fender sections and the intermediate molding shank portion are secured together by means of bolts, as indicated at 35, and nuts, as indicated at 36. This molding encloses the joint between the crown portions of the fenders and provides a rigid base for securing the depending flanges together. The molding has the additional function of improving the appearance of the fender and it can be formed of moistureproof material. This molding can assume a natural metal color or it can be painted to conform with the color of the associated fender sections.

The front fender sections can be detachably secured together by the described bolt and nut means because they are accessible. However, a different type of securing means must be provided with the rear fender sections when the apron is as extensive as illustrated due to inaccessibility. As a means for securing the rear fender sections together which is detachable from the exterior of the fender, I provide a plurality of metal strips 37 along the under side of the outer fender section which are preferably welded thereto. These strips project through openings formed in the flanges 30 and 31 and the molding shank 34 so that they lie beneath the inner section 21 of the rear fender and can be engaged by fastening means, such as a thumb screw 38, projecting through extensions, as indicated at 39, on the rear fender molding and through the fender section 21. The fasteners 38 can be attached to or detached from the strips 37 and thereby hold the rear fender sections together or allow them to be detached.

The head portion 33 of the moldings is designed to fit closely against the fender sections so that moisture cannot pass therebeneath and cause rusting of the fender sections. As a means of preventing moisture from entering the joints between the flanges 27 and 28, suitable moistureproof gaskets 40 can be interposed between the molding and the flanges of the fender section, as shown in Fig. 7.

Figure 6:
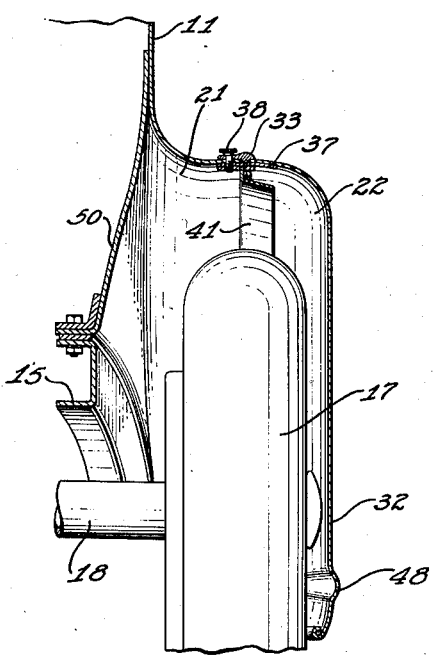
Fig. 6 is a sectional view of the rear fender taken on line 6—6 of Fig. 1.
Figure 9:
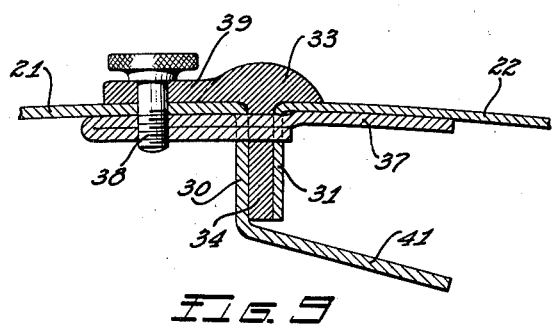
Fig. 9 is a sectional view, taken on line 9—9 of Fig. 8, illustrating the securing means and splash guard for the joint of the rear fender.

In order to prevent water thrown by the wheels from entering the joint between the flanges 27 and 28 or 31 and 32 of the fenders, I propose to provide a splash guard means, as shown in Figs. 6 and 9. This means consists of a plate 41 which extends longitudinally of the fender and traverses the under edges of the joint. The plate 41 is preferably the outer edge portion of one of the inturned flanges which is bent across the adjacent flange to cover the joint therebetween so that water thrown by the wheel will be deflected.

If desired, the moldings can be formed with an opening as indicated at 42 for the reception of a courtesy light 43.

The front fender structure herein illustrated presents a crown and apron which extend well toward the ground at the front of the wheel and the curvature of the fender both longitudinally and transversely is sweeping. The rear portion of the fender tapers from both sides toward the molding and the flange 23 extends around downwardly of and beneath the flange 27. The flange 28 of the outer front fender section curves around the rear end and extends forwardly as indicated at 44. The rear end of this fender section is so formed in order that the flanged portion can snugly fit into a recess 45 at the forward end of the running board 46. Suitable securing means, as indicated at 47, extend through the flange 44 and the rear end of the flange 28 to secure the fender to the running board. It will be understood that the running board is secured to the frame in any conventional manner. The forward ends of the rear fender sections are formed to extend parallel with the rear end of the running board to which they are secured by any suitable removable means.

The running board is preferably stream lined with its thickness decreasing toward the front and rear. The apron portion of the outer section of the rear fender is formed with a beading 48 which is arranged to form a continuation of the outer edge of the running board. This beading is formed to carry out the stream line effect as a continuation of the outer edge of the running board.

It will be seen that the outer sections of the fenders can be readily removed and that, by forming the fenders in sections, the initial drawing requirements and ease of reworking after collision will be materially less than when the fender is formed in one piece. I propose to form the outer sections of the fenders of thinner gauge sheet metal than the inner sections are formed of or of a material which will be deformed more readily than that of the inner fender sections. In this way, when the outer sections of the fenders are struck, they will deform more readily and, in many instances, the forces are not transmitted to the securing means sufficiently to deform the inner fender sections. As a consequence, in a good many instances, only the outer sections will have to be reworked or replaced in case of collision whereas otherwise the entire fender would have to be reworked or replaced.

It will be seen that my invention will materially lessen the cost of fenders of the type set forth and that it will reduce the cost of fender replacement and repair resulting from collision.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle, the combination of a metal body cover comprising a sheet metal fender section integral with a body panel and extending outwardly therefrom to form a partial but appreciable covering for the wheel, and a sheet metal fender section forming the remainder of the wheel covering and detachably secured to said extended section.

2. In a motor vehicle, the combination of a metal body cover comprising a sheet metal fender section integral with a body panel and extending outwardly therefrom to form a partial but appreciable covering for the wheel, a down turned flange along the outer edge thereof, and a sheet metal fender section forming the other part of the wheel covering and having a down turned flange along its inner edge, and means securing the sections together at the flanges.

3. In a motor vehicle, a fender comprising longitudinally extending sections having down-turned flanges, the outer section being fully aproned, and means extending through at least one of said flanges for detachably securing the flanges together, said securing means including devices operable from the exterior of the fender to release said securing means.

FRANK C. BEST.